(12) United States Patent
Everitt

(10) Patent No.: US 6,356,420 B1
(45) Date of Patent: Mar. 12, 2002

(54) STORAGE SYSTEM HAVING READ HEAD UTILIZING GMR AND AMR EFFECTS

(75) Inventor: Brenda A. Everitt, Minneapolis, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/174,021

(22) Filed: Oct. 16, 1998

Related U.S. Application Data

(60) Provisional application No. 60/084,653, filed on May 7, 1998.

(51) Int. Cl.$^7$ .................................................. G11B 5/39
(52) U.S. Cl. .............................. 360/324.12; 338/32 R; 324/252
(58) Field of Search ...................... 360/324.12, 324.1; 338/32 R; 324/252, 207.21

(56) References Cited

U.S. PATENT DOCUMENTS

| | | | |
|---|---|---|---|
| 4,623,867 A | 11/1986 | Lundquist et al. | 338/32 R |
| 4,843,505 A | 6/1989 | Mowry | 360/113 |
| 4,949,039 A | 8/1990 | Grünberg | 324/252 |
| 4,967,298 A | 10/1990 | Mowry | 360/113 |
| 4,972,284 A | 11/1990 | Smith et al. | 360/113 |
| 4,987,508 A | 1/1991 | Smith | 360/113 |
| 5,018,037 A | 5/1991 | Krounbi et al. | 360/113 |
| 5,055,786 A | 10/1991 | Wakatsuki et al. | 324/252 |
| 5,079,035 A | 1/1992 | Krounbi et al. | 427/130 |
| 5,206,590 A | 4/1993 | Dieny et al. | 324/252 |

(List continued on next page.)

OTHER PUBLICATIONS

S. Mao, et al., "NiMn–Pinned Spin Valves With High Pinning Field Made By Ion Beam Sputtering", *Appl. Phys. Lett.*, vol. 69, No. 23, pp. 3593–3595, Dec. 2, 1996.
Devasahayam et al., "Exchange Biasing with NiMn," NSIC Meeting, Dec. 12, 1995.
Devasahayam et al., "Domain Stabilization With MR Heads," NSIC Heads Program Monthly Report, Feb. 14, 1996.
Devasahayam et al., "Exchange Biasing with NiMn," DSSC Spring '96 Review, Carnegie Mellon University.
Lin et al., "Improved Exchange Coupling Between Ferromagnetic Ni–Fe and Antiferromagnetic Ni–Mn–based Films," *Appl. Phys. Lett.*, vol. 65, No. 9, pp. 1183–1185, Aug. 29, 1994.
Ed Murdock, "Spin Valve Heads at Seagate Technology", Discon, Sep. 1996.
John C. Mallinson, "The Anisotropic Magneto–Resistive Effect", *Magneto–resistive heads*, Academic Press, 1996, ISBN 0–12–466630–2, Chapter 4, pp. 25–56.
"Linearity of Unshielded Spin–Valve Sensors", by N. Sugaware et al., *American Institute of Physics*, 1997, 3 pages.
"AMR Effect in Spin–Valve Structure", by Y. Uehara et al., *IEEE Transactions on Magnetics*, vol. 32, No. 5, Sep. 1996, pp. 3432–3433.

*Primary Examiner*—Brian E. Miller
(74) *Attorney, Agent, or Firm*—Westman, Champlin & Kelly, P.A.

(57) ABSTRACT

A data storage system includes a storage medium having a data surface with data storage thereon, the stored data comprises variations in magnetic fields across the data surface. A magnetoresistive sensor exhibits both giant magnetoresistive (GMR) and anisotropic magnetoresistive (AMR) effects which are used to read back the stored data.

19 Claims, 7 Drawing Sheets

U.S. PATENT DOCUMENTS

| | | | | |
|---|---|---|---|---|
| 5,285,339 | A | 2/1994 | Chen et al. | 360/113 |
| 5,315,468 | A | 5/1994 | Lin et al. | 360/113 |
| 5,351,003 | A | 9/1994 | Bauer et al. | 324/207.12 |
| 5,381,291 | A | 1/1995 | Madsen et al. | 360/113 |
| 5,402,292 | A | 3/1995 | Komoda et al. | 360/113 |
| 5,412,524 | A | 5/1995 | Nagata et al. | 360/113 |
| 5,422,571 | A | 6/1995 | Gurney et al. | 324/252 |
| 5,428,491 | A | 6/1995 | Smith | 360/113 |
| 5,475,304 | A | 12/1995 | Prinz | 324/207.21 |
| 5,485,334 | A | 1/1996 | Nix et al. | 360/113 |
| 5,532,584 | A | 7/1996 | Jeffers et al. | 324/202 |
| 5,532,892 | A | 7/1996 | Nix et al. | 360/113 |
| 5,534,355 | A | 7/1996 | Okuno et al. | 428/611 |
| 5,549,977 | A | 8/1996 | Jin et al. | 428/692 |
| 5,552,589 | A | 9/1996 | Smith et al. | 235/449 |
| 5,573,809 | A | 11/1996 | Nix et al. | 427/123 |
| 5,583,725 | A | 12/1996 | Coffey et al. | 360/113 |
| 5,608,593 | A | 3/1997 | Kim et al. | 360/113 |
| 5,616,370 | A | 4/1997 | Okuno et al. | 427/547 |
| 5,633,770 | A | 5/1997 | Che | 360/113 |
| 5,648,885 | A | 7/1997 | Nishioka et al. | 360/113 |
| 5,650,887 | A | 7/1997 | Dovek et al. | 360/75 |
| 5,682,284 | A | 10/1997 | George | 360/113 |
| 5,686,838 | A | 11/1997 | van den Berg | 324/252 |
| 5,688,605 | A | 11/1997 | Iwasaki et al. | 428/611 |
| 5,696,655 | A | 12/1997 | Kawano et al. | 360/113 |
| 5,696,656 | A | 12/1997 | Gill et al. | 360/113 |
| 5,701,222 | A | 12/1997 | Gill et al. | 360/113 |
| 5,702,832 | A | 12/1997 | Iwasaki et al. | 428/611 |
| 5,705,973 | A | 1/1998 | Yuan et al. | 338/32 R |
| 5,717,550 | A | 2/1998 | Nepela et al. | 360/113 |
| 5,725,963 | A | 3/1998 | Iwasaki et al. | 428/611 |
| 5,737,156 | A | 4/1998 | Bonyhard | 360/113 |
| 5,738,946 | A | 4/1998 | Iwasaki et al. | 428/611 |
| 5,739,988 | A | 4/1998 | Gill | 360/113 |
| 5,739,990 | A | 4/1998 | Ravipati et al. | 360/113 |
| 5,742,162 | A | 4/1998 | Nepela et al. | 324/252 |
| 5,751,521 | A | 5/1998 | Gill | 360/113 |
| 5,756,191 | A | 5/1998 | Hashimoto et al. | 428/209 |
| 5,768,069 | A | 6/1998 | Mauri | 360/113 |
| 6,169,647 | B1 * | 1/2001 | Mao et al. | 360/324.11 |

* cited by examiner

STORAGE SYSTEM HAVING READ HEAD UTILIZING GMR AND AMR EFFECTS

The present invention claims priority to Provisional Application Serial No. 60/084,653, filed May 7, 1998, and entitled READ HEAD USING AMR AND GMR.

BACKGROUND OF THE INVENTION

The present invention relates to data storage systems. More specifically, the present invention relates to data storage systems using read heads which utilize the giant magnetoresistive (GMR) effect.

Magnetic sensors utilizing the GMR effect, frequently referred to as "spin valve" sensors, are known in the art. A spin valve sensor is typically a sandwiched structure consisting of two ferromagnetic layers separated by a thin non-ferromagnetic layer. One of the ferromagnetic layers is called the "pinned layer" because it is magnetically pinned or oriented in a fixed and unchanging direction by an adjacent anti-ferromagnetic layer, commonly referred to as the "pinning layer," through anti-ferromagnetic exchange coupling. The other ferromagnetic layer is called the "free" or "unpinned" layer because the magnetization is allowed to rotate in response to the presence of external magnetic fields.

In a giant magnetoresistive sensor, a sense current is applied to the sensor. In the presence of a magnetic field such as that provided by magnetic storage medium, the resistance of the sensor changes resulting in a change in voltage due to the applied sense current. This voltage change may be measured and used to read back information. The operation of one configuration of a GMR sensor is described in U.S. Pat. No. 4,949,039, issued Aug. 14, 1990 to Grünberg, entitled "MAGNETIC FIELD SENSOR WITH FERROMAGNETIC THIN LAYERS HAVING MAGNETICALLY ANTIPARALLEL POLARIZED COMPONENTS".

GMR based sensors provide a greater response to a magnetic field in comparison to non-GMR type MR sensors (called anisotropic magnetoresistive (AMR) sensors) in which the resistance of the material changes with applied magnetic field. Thus, GMR sensors are the preferred type of magnetoresistive sensor. One type of sensor which utilizes both GMR and AMR effects is described in U.S. Pat. No. 5,206,590 issued Apr. 27, 1993 to Dieny et al. and entitled "MAGNETORESISTIVE SENSOR BASED ON THE SPIN VALVE EFFECT". In the Dieny et al. patent, the magnetization vector in the pinned layer is fixed perpendicular to the air bearing surface (ABS) of the slider and the magnetization vector of the free layer is parallel to the ABS. Further, the field to be detected is along the hard axis of the free layer. FIG. 9 of Dieny et al. shows that the excitation field Ha is perpendicular to the easy axis magnetization direction and to the ABS. This is similar to the configuration in U.S. Pat. No. 5,739,988 to Gill in which the sense current is oriented at an angle of 45° relative to the ABS.

As storage density increases, the magnetic field being sensed during the readback becomes smaller. Therefore, there is an ongoing desire to provide improved sensitivity of read heads for data storage systems.

SUMMARY OF THE INVENTION

A data storage system includes a storage medium having a data surface with data stored thereon, the stored data comprises variations in magnetic fields across the data surface. A slider is adapted to move across the data surface, the slider includes an air bearing surface which is substantially parallel to the data surface. A current source provides a sense current (I) and readback circuitry is adapted to receive a readback signal and responsively provide a data output. A magnetoresistive sensor carried on the slider is adapted to receive the sense current (I) in a sense current direction through the sensor, readback data from the data surface in response to variations in the magnetic field across the disc surface, and responsively provide the readback signal to the readback circuitry. The sensor is adapted to exhibit a GMR effect in response to a magnetic field. The sensor includes a free layer and a pinned layer. The free layer further provides an anisotropic magnetoresistive (AMR) response to the magnetic field. The quiescent bias point of the magnetization vector of the free layer ($M_{FREE}$) includes a component which is perpendicular to the sense current direction to thereby enhance the sensitivity of the AMR response such that the readback signal is a function of the GMR effect and the AMR response of the sensor.

DETAILED DESCRIPTION OF THE PREFERRED EMBODIMENTS

The present invention relates to magnetoresistive sensors of the giant magnetoresistive (GMR or spin valve) type which are used to read back information from storage media such as magnetic discs. One aspect of the present invention includes the recognition that a hybrid magnetoresistive sensor may be designed that utilizes both GMR and AMR effects to increase the sensitivity of the sensor.

Figure 1:
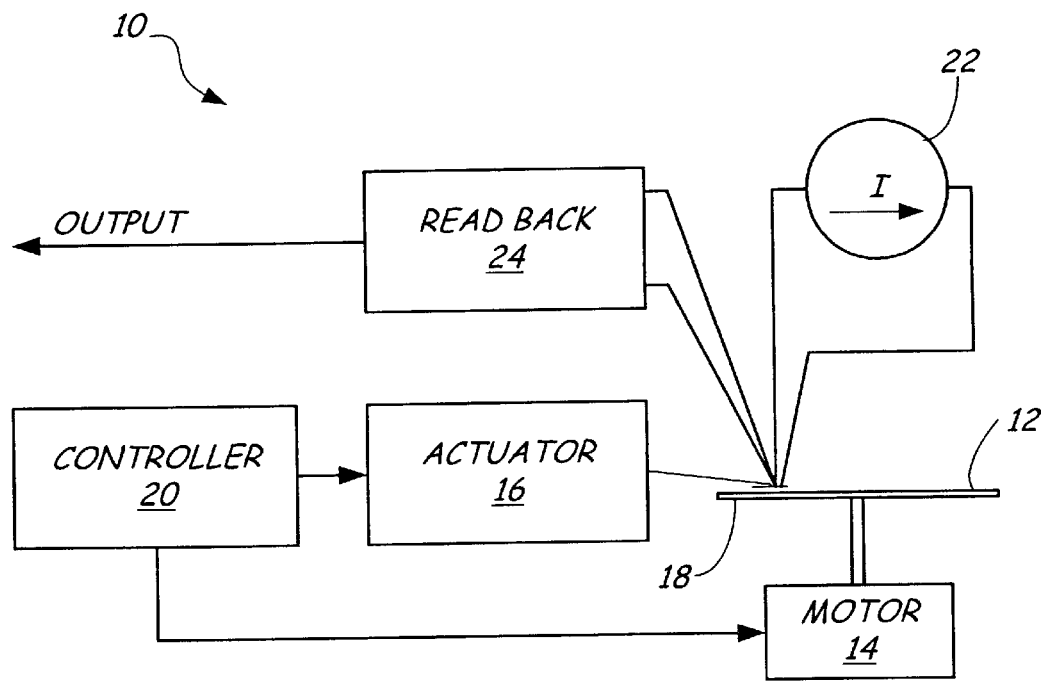
FIG. 1 is a simplified diagram of a storage system in accordance with the present invention.

The present invention includes a new spin valve sensor which may be used in a data storage system such as data storage system 10 shown in FIG. 1. System 10 includes storage medium 12 such as a magnetic disc which is rotated by motor 14. An actuator 16 is coupled to a slider 18 which is used to position a magnetoresistive sensor (not shown in FIG. 1) over a surface of disc 12. A controller 20 controls positioning of slider 18. The magnetoresistive sensor operates by receiving a sense (or bias) current I from current source 22. Variations in a magnetic field applied to the magnetoresistive sensor due to magnetization of disc 12 cause a change in the electrical resistance of the sensor. This change in electrical resistance is detected with readback circuitry 24 which responsively provides data output. Operation of spin valves is known in the art and is described, for example, in U.S. Pat. No. 4,949,039, issued Aug. 14, 1990 to Grünberg, which is hereby incorporated by reference.

Figure 2:
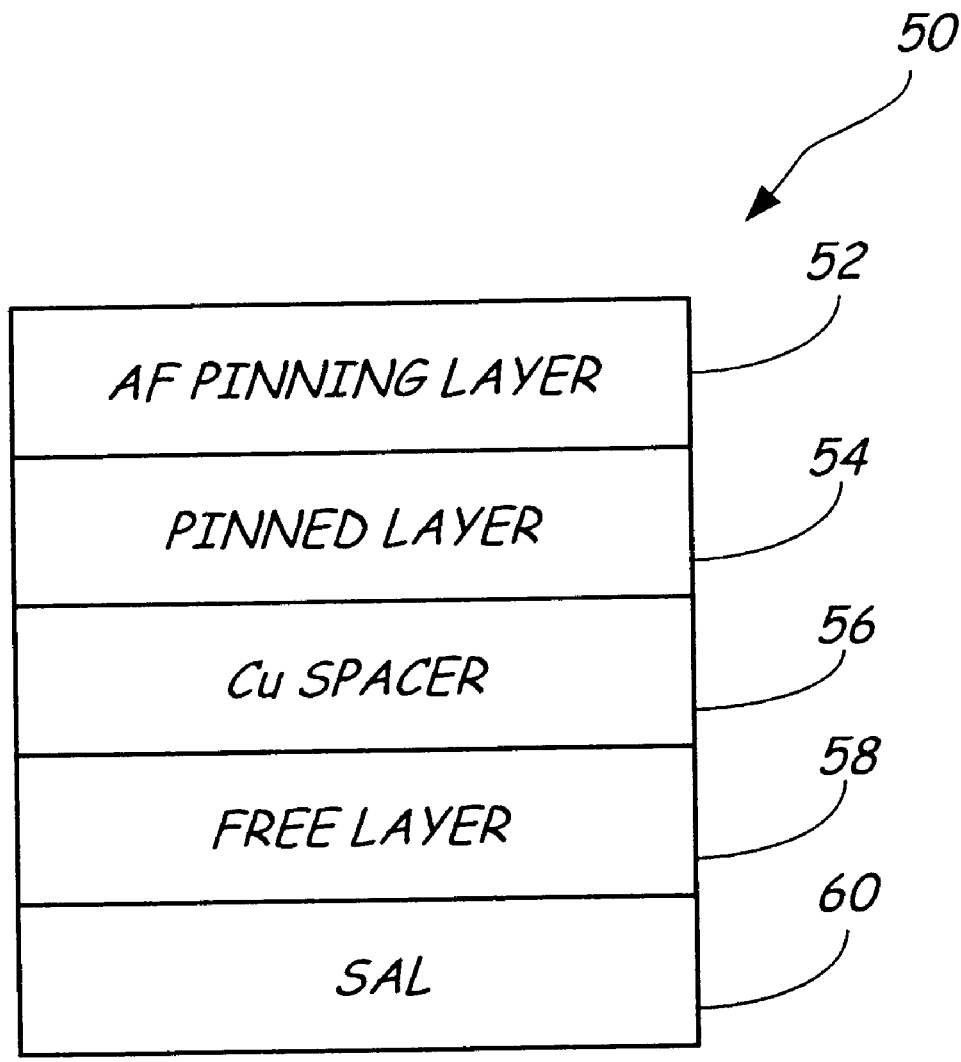
FIG. 2 is a simplified diagram of a magnetoresistive sensor in accordance with the present invention in the storage system of FIG. 1.

FIG. 2 is a side cross-sectional view of a prior spin valve 50 for use in, for example, system 10 of FIG. 1. Spin valve 50 includes antiferromagnetic pinning layer 52, pinned layer 54, Cu spacer 56, free layer 58 and an optional soft adjacent layer (SAL) 60.

Figure 3:
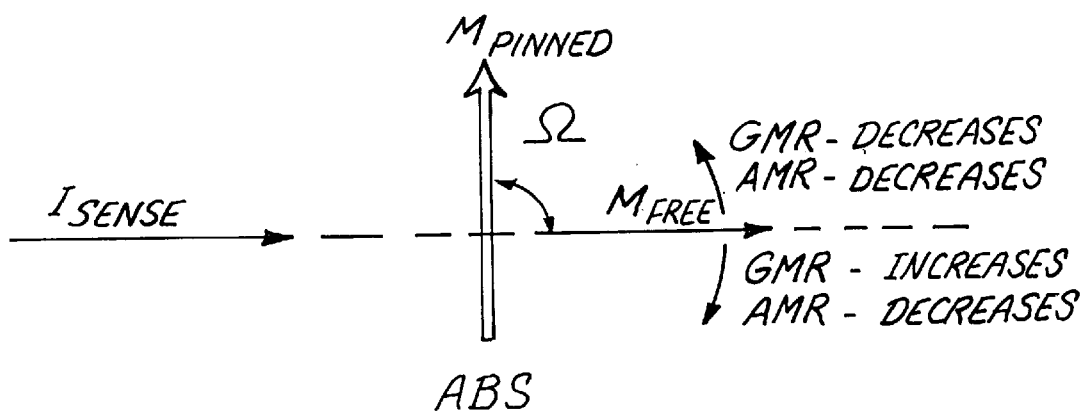
FIG. 3 is a graph illustrating magnetization vector configuration of a prior art GMR sensor.

FIG. 3 is a diagram showing the magnetic biasing of a prior art GMR sensor. As illustrated in FIG. 3, the magnetization of the pinned layer ($M_{PINNED}$) is in a direction which is substantially perpendicular (from about 5 to about 10° from normal) to the air bearing surface (ABS) of the slider. The free layer is biased with its magnetization ($M_{FREE}$) substantially parallel to the ABS. In the presence of an applied magnetic field, the magnetization of the free layer $M_{FREE}$ rotates clockwise when sensing one polarity of transition and counter clockwise when sensing the opposite polarity. The change in resistance of the element (ΔR (GMR)) is proportional to $(1-(\cos\Omega))/2$, where $\Omega$ is the angle between $M_{PINNED}$ and $M_{FREE}$. In the biased state, $\Omega$ is preferably about equal to 90° in prior art designs as illustrated in FIG. 3. As an example, in a typical abutted junction type head, with a stripe height of less than 1 $\mu$m and a reader width of about 1 $\mu$m with the free layer thickness of about 4 nm, and a range of free layer magnetization vector ($M_{FREE}$) excursions about the biased point $M_{FREE}$ of about ±10°. The resultant signal is only about ⅙ of the maximum possible resistance change due to the GMR effect. For example, if the sensor exhibited a 6% resistance change over its entire 180°. range, there will only be about a 1% change in resistance during normal operating conditions.

Typically, free layer 58 in a GMR sensor comprises materials such as NiFe, NiFeCo, Co or CoFe, or combinations of these materials in a bilayer structure. One aspect of the present invention includes a recognition that these materials exhibit an anisotropic magnetoresistive (AMR) effect. However, in a typical prior art spin valve using a NiFe/Co bilayer as the free layer, the AMR effect may be only about a 1% resistance change in the as deposited film. The AMR effect follows a $\cos(2\theta)$ angular dependence, where $\theta$ is the angle between the free layer 58 magnetization direction ($M_{FREE}$) and the bias current direction ($I_{SENSE}$) through the sensor. When the pinned layer ($M_{PINNED}$) is perpendicular to the bias current ($I_{SENSE}$), $\theta$ equals $\Omega-90°$ and the resistance change due to the AMR effect, ΔR(AMR), is proportional to $\sin(2\Omega-(\pi/2))$.

Figure 4A:
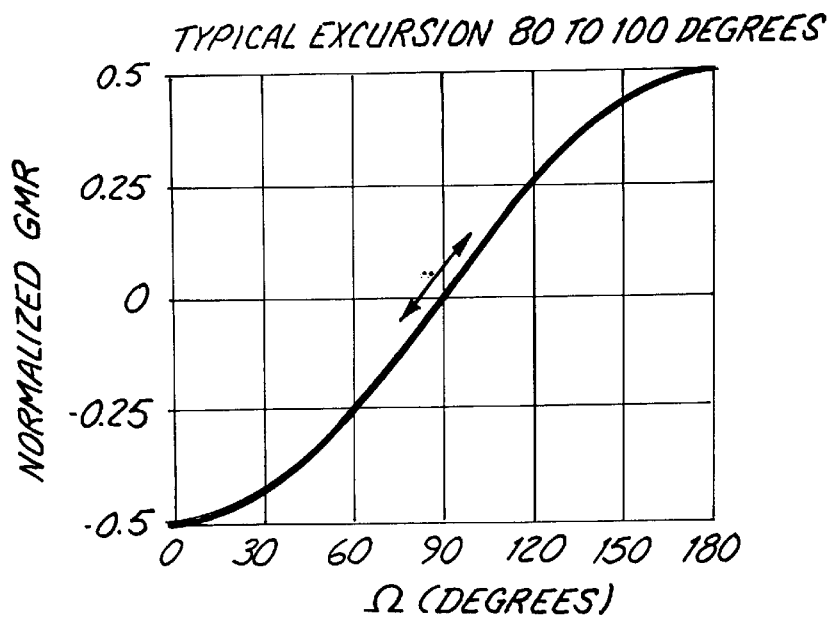
FIG. 4A is a graph of normalized GMR versus Ω for a prior art GMR sensor.
Figure 4B:
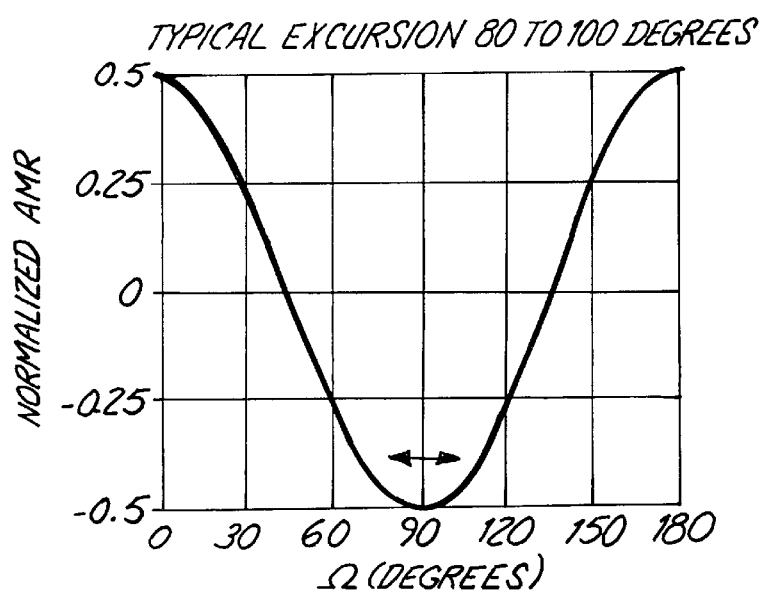
FIG. 4B is a graph of normalized AMR versus Ω for a prior art GMR sensor.
Figure 4C:
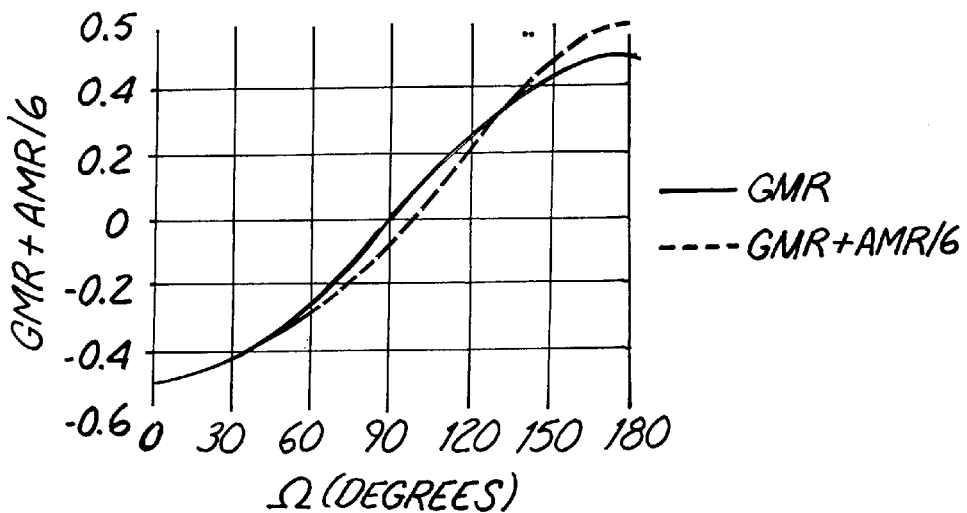
FIG. 4C is a graph of GMR and GMR plus AMR/6 versus Ω for a prior art GMR sensor.
Figure 4D:
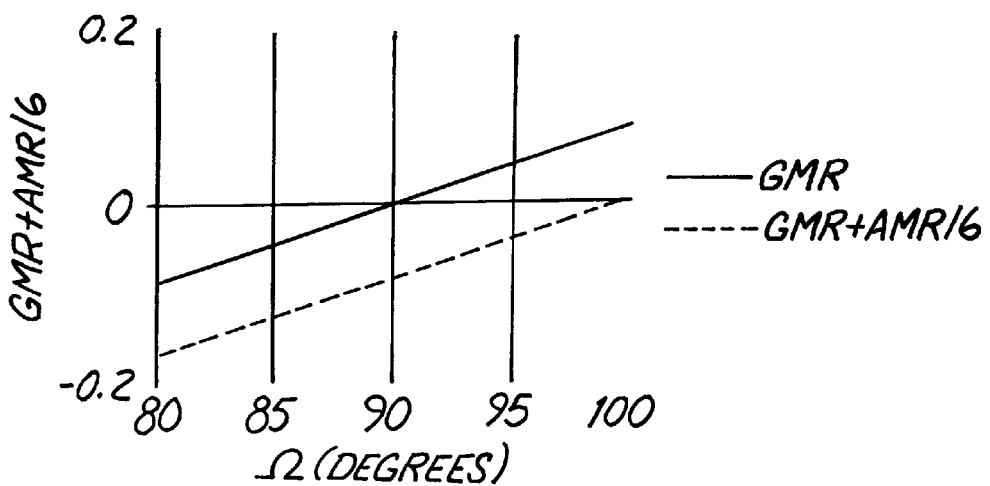
FIG. 4D is an enlarged view showing ±10° excursions of the graph of FIG. 4C.

In a prior art GMR biased sensor, for free layer magnetization vector ($M_{FREE}$) excursions of about ±10%, the AMR resistance change is only about 6% of its maximum value since the free layer is not biased along the sensitive part of the AMR curve. This is illustrated in FIG. 4B which is a graph of normalized AMR versus $\Omega$. For a sheet film AMR of 1%, this change is only about a 0.06% change in resistance in comparison with a GMR effect of about 1% resistance change in the present example. Thus, the AMR effect is fairly negligible in prior art GMR designs, however, it does contribute some asymmetry in the readback signal. FIG. 4A is a graph of normalized GMR versus $\Omega$ illustrating that in a prior art GMR head, the sensor is biased to maximize the GMR effects. FIG. 4C illustrates the change in prior art sensor output for GMR and GMR plus AMR/6 versus $\Omega$. FIG. 4D is an expanded view of the graph of FIG. 4C showing excursions of ±10° in $\Omega$. As illustrated in FIG. 4D, the amplitude of the output is not changed much by the AMR effect. This is because the bias is at a relatively insensitive point in the AMR curves illustrated in FIG. 4B.

Figure 5:
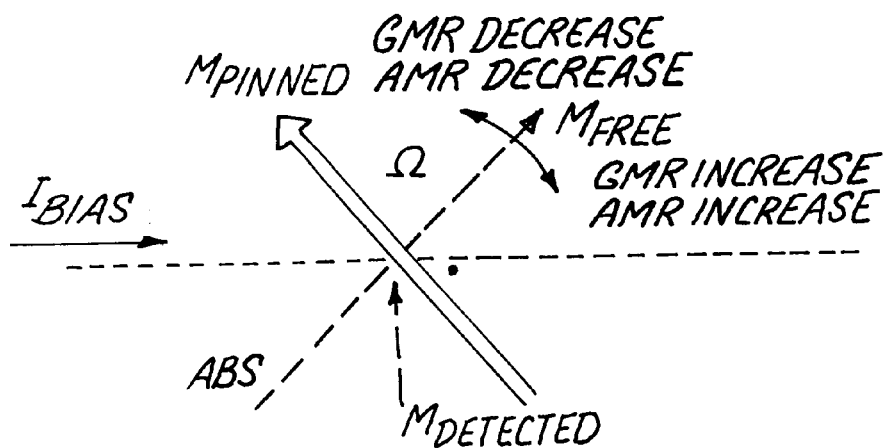
FIG. 5 is a graph of magnetization vectors for the sensor of FIG. 2 in accordance with the present invention.

FIG. 5 is a vector diagram illustrating magnetoresistive sensor 50 including an enhanced AMR effect in accordance with the present invention. As illustrated in FIG. 5, the free layer 58 is biased upwards, typically 45° away from the air bearing surface (ABS). This is similar to the configuration in a soft adjacent layer (SAL) type AMR head. The pinned layer magnetization vector ($M_{PINNED}$) is fixed substantially perpendicular to the free layer in the quiescent state. Soft adjacent layer biasing techniques are described in co-pending application Ser. No. 08/949,948, entitled SOFT ADJACENT LAYER VERTICALLY BIASED MAGNETORESISTIVE SENSOR HAVING IMPROVED SENSOR STABILITY which is commonly assigned with the present application and hereby incorporated by reference. Using the present invention as illustrated in FIG. 5, the AMR effect is additive to the GMR effect providing enhanced sensitivity. Such that excursions of $M_{FREE}$ about the biased point of the free layer results in additive increases or decreases of the AMR effect relative to the GMR effect.

Figure 6A:
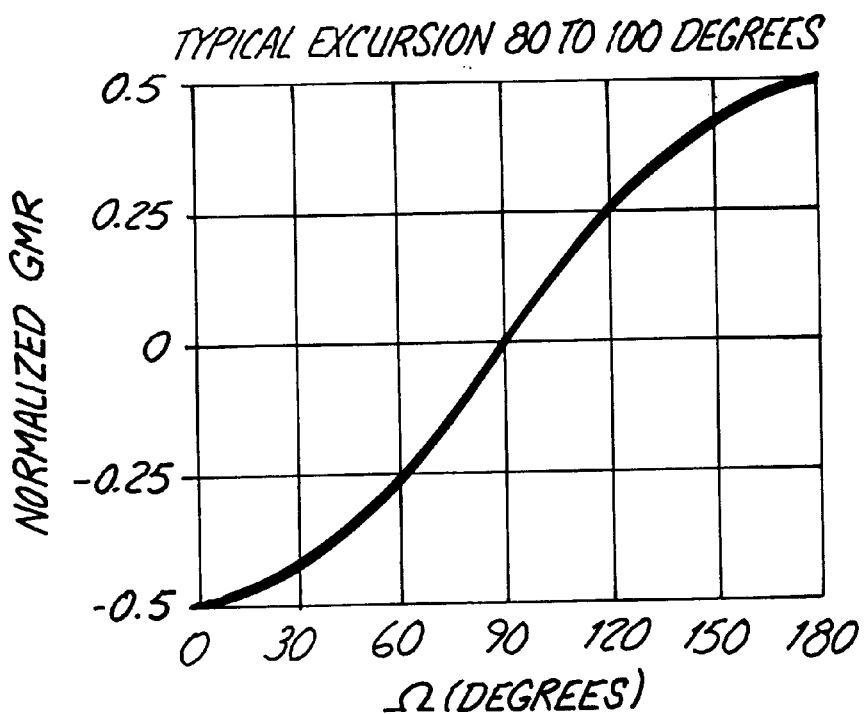
FIG. 6A is a graph of normalized GMR versus a magnetoresistive sensor in accordance with the invention.
Figure 6B:
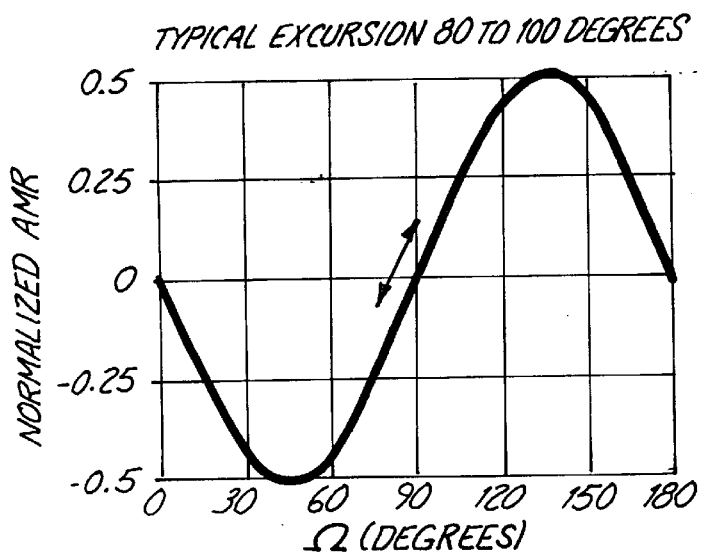
FIG. 6B is a graph of normalized AMR versus a magnetoresistive sensor in accordance with the invention.
Figure 6C:
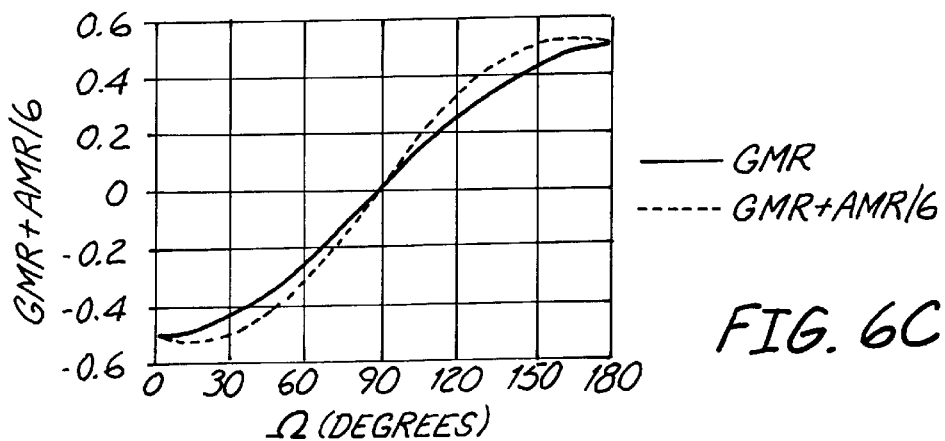
FIG. 6C is a graph of GMR and GMR plus AMR/6 versus a magnetoresistive sensor in accordance with the invention.
Figure 6D:
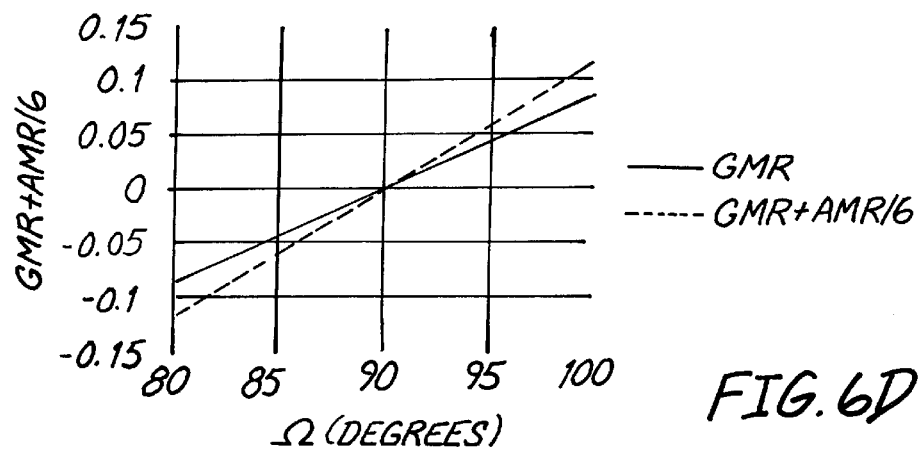
FIG. 6D is an enlarged view showing ±10° excursions of the graph of FIG. 6C.

FIGS. 6A–6D are graphs illustrating operation of magnetoresistive sensor 50 in accordance with the present invention. FIGS. 6A and 6B show excursions of the normalized GMR response and normalized AMR response, respectively, versus $\Omega$. As illustrated in FIGS. 6A and 6B, the normal bias point of the free layers 58 magnetization vector ($M_{FREE}$) is about 90° such that the change in output (ΔR) is substantially maximized. If the AMR effect for a sheet film is about ⅙ that of the GMR effect (e.g., 6% GMR and 1% AMR), FIG. 6C illustrates the change in overall sensor output versus the angle $\Omega$ of $M_{FREE}$ in comparison to the GMR effect. FIG. 6D is an enlarged view of FIG. 6C showing excursions of ±10% for GMR and GMR plus AMR/6. As illustrated in FIGS. 6A–6D, the offset bias of the $M_{FREE}$ vector in accordance with the invention increases the sensitivity of the sensor. For this specific example, the output is enhanced by more than 33%.

In the present invention, $M_{FREE}$ may be biased between about 35° and about 55°, and preferably at about 45°, relative to the sense current I. Further, $M_{PINNED}$ may be between about 80° and about 100°, and preferably about 90°, relative to $M_{FREE}$. In contrast to the structure shown in U.S. Pat. No. 5,206,590 to Dieny et al., in the present invention the magnetization vector of the pinned layer is preferably about 45° to the ABS and the magnetization vector of the free layer is preferably about 45° to the ABS in the quiescent state. Additionally, in the present invention the field to be detected is approximately 45° relative to the hard axis of the free layer and the sense current (I) flows approximately parallel to the ABS.

The present invention can be realized using any appropriate configuration. For example, the spin valve stack illustrated in FIG. 2 is utilized by having the pinned layer 54 fixed at the proper bias by orienting the wafer during deposition and/or annealing of the spin valve film. The free layer 58 is preferably biased at substantially 45° using standard spin valve bias parameters including sense current I, $H_1$ ferromagnetic coupling with the pinned layer, and image current by configuring the element in an asymmetric gap. In another example embodiment, a soft adjacent layer (SAL) 60 bias can be used to bias the free layer 58 at an offset angle. A Cu spacer and a pinned layer are added to either the top or bottom of the stack in order to obtain GMR effects. The pinned layer 54 magnetization direction is fixed by deposition and/or annealing conditions.

Although the present invention has been described with reference to preferred embodiments, workers skilled in the art will recognize that changes may be made in form and detail without departing from the spirit and scope of the invention.

What is claimed is:

1. A storage system, comprising:
   a storage medium having a data surface with data stored thereon, the stored data comprising variations in magnetic field across a data surface;
   a slider adapted to move across the data surface, the slider having an air bearing surface (ABS) substantially parallel to the data surface;
   a current source providing a sense current (I);
   readback circuitry adapted to receive a readback signal and responsively provide a data output;
   a magnetoresistive sensor carried on the slider adapted to receive the sense current in a sense current direction substantially parallel to the ABS, read data from the data surface in response to variations in the magnetic field across the disc surface, and responsively provide the readback signal to the readback circuitry, the sensor comprising:
   a giant magnetoresistive (GMR) sensor adapted to exhibit a GMR effect in response to a magnetic field, the GMR sensor including a free layer having a magnetization vectorat about 45° to the ABS and a pinned layer having a magnetization vectorat about 45° to the ABS, the free layer further providing an anisotropic magnetoresistive (AMR) response to the magnetic field which has a vector component at 45° to a hard axis of the free layer; and
   wherein a quiescent bias point of a magnetization vector ($M_{FREE}$) of the free layer is about 45° to the ABS and includes a component which is perpendicular to the sense current direction to thereby enhance the sensitivity of the AMR response whereby the readback signal is a function of the GMR effect and the AMR effect of the sensor.

2. The storage system of claim 1 wherein the free layer has a quiescent bias point of about 45° relative to the sense current (I) direction.

3. The storage system of claim 1 wherein the GMR sensor includes a soft adjacent layer (SAL) to bias the free layer.

4. The storage system of claim 1 wherein the free layer is biased through ferromagnetic coupling with the pinned layer.

5. The storage system of claim 1 wherein the free layer is biased through an image current by an asymmetrical gap configuration.

6. The storage system of claim 1 wherein the free layer is biased by the sense current.

7. The storage system of claim 2 wherein the pinned layer is biased substantially perpendicular to the quiescent biased point of the free layer.

8. The storage system of claim 1 wherein excursions of the magnetization vector of the free layer about the quiescent bias point causes simultaneous increases or simultaneous decreases in sensor resistance due to the AMR and GMR effects.

9. The storage system of claim 1 wherein the free layer includes a NiFe layer.

10. The storage system of claim 1 wherein the free layer includes a NiFeCo layer.

11. The storage system of claim 1 wherein the free layer includes a Co layer.

12. The storage system of claim 1 wherein the free layer includes a CoFe layer.

13. The storage system of claim 1 wherein the free layer includes a NiFe/Co layer.

14. The storage system of claim 1 wherein the AMR effect is less than about ⅓ of the GMR effect.

15. A sensor for receiving a sense current (I) and having a voltage drop which changes in response to magnetic fields, comprising:
   a sensor plane, wherein the sense current is substantially parallel to the sensor plane;
   a free layer having a quiescent magnetization bias point ($M_{FREE}$) at about 45° to the sensor plane and with a vector component perpendicular to the sense current (I);
   a pinned layer having a magnetization vector at about 45° to the sensor plane and with a component perpendicular to $M_{FREE}$; and
   wherein the change in voltage drop is substantially a function of both giant magnetoresistive (GMR) and anisotropic magnetoresistive (AMR) effects.

16. The sensor of claim 15 where $M_{FREE}$ is about 45° relative to the sense current (I).

17. The sensor of claim 15 including a soft adjacent layer (SAL) to bias $M_{FREE}$ of the free layer.

18. The sensor of claim 15 wherein the pinned layer has a magnetization vector $M_{PINNED}$ substantially perpendicular to $M_{FREE}$.

19. The sensor of claim 15 wherein the free layer includes a NiFe/Co bilayer.

* * * * *